June 23, 1964  M. A. CHILCOAT  3,138,175
HIGH PRESSURE MODULATING VALVE
Filed Nov. 22, 1960
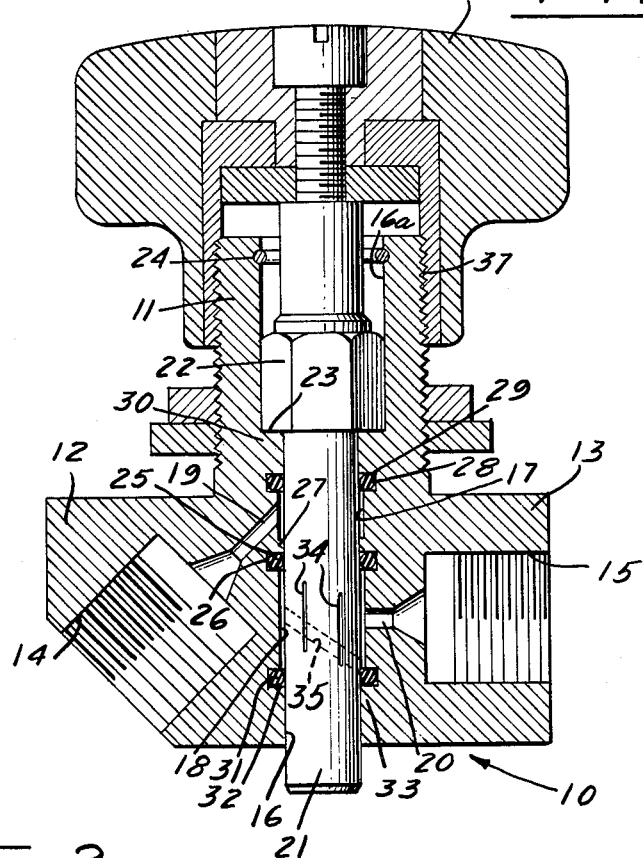
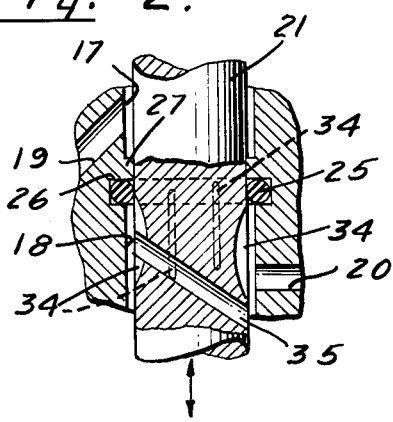
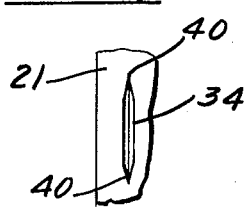
Murray A. Chilcoat,
INVENTOR.
WHANN & McMANIGAL
Attorneys for Applicant

United States Patent Office 3,138,175
Patented June 23, 1964

3,138,175
HIGH PRESSURE MODULATING VALVE
Murray A. Chilcoat, Monterey Park, Calif., assignor to Futurecraft Corporation, El Monte, Calif., a corporation of California
Filed Nov. 22, 1960, Ser. No. 71,083
2 Claims. (Cl. 137—625.3)

The present invention relates generally to valve means for controlling flow of fluid, and is more particularly concerned with valves for the modulation of fluid flow under relatively high pressure conditions.

Heretofore, flow modulation of fluids under relatively high pressures of the order of 5–10,000 p.s.i. has in the main been difficult and unsatisfactory with conventionally available devices. Valves for this purpose of the needle or disc type have in the main proved unsatisfactory primarily due to their inherent characteristics which prevent variation of the flow in very small increments which may be accurately controlled, and which will not be subject to variations and changes under extreme temperature variations.

Having in mind the foregoing disadvantages inherent in conventionally available devices for the above noted purpose, it is one object of the present invention to provide a modulating valve device which may be embodied in a relatively small unit; which may be easily and accurately adjusted; and which will provide efficient and dependable service over long periods of use.

A further object of the present invention is to provide a valve of the above character which is operable to modulate fluid flow at relatively high pressures, but which may be readily actuated to a non-modulating position of full flow.

The valve of the present invention briefly embodies an elongate poppet which is reciprocably movable within a valve chamber which is separated into inlet and outlet sections by means of a sealing ring around the poppet. The poppet is provided with a series of circumferentially spaced surface slits having one set of their corresponding ends in staggered relation so that they may be successively moved into and out of communication with the inlet section of the valve chamber so as to modulate fluid flow from the inlet side of the sealing member to the outlet side. The poppet is also provided with a transverse passage which in one position of the poppet will connect the inlet with the outlet through a full flow passage, when it is not desired to modulate the flow.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a vertical sectional view taken through a valve structure embodying the concepts of the present invention;

FIG. 2 is an enlarged fragmentary section of the valving mechanism to more clearly show the cooperative relationship of the valving members; and FIG. 3 is an enlarged fragmentary view showing a modified slit construction.

Referring more specifically to the drawings, for illustrative purposes the valve of the present invention is shown in FIG. 1 as embodying a body structure as generally indicated at 10. The valve body shown is of substantially an inverted T-shaped structure with a central projecting portion 11 and right angled portions 12 and 13 which extend in opposite directions from the central portion. The portions 12 and 13 are bored and threaded or otherwise formed to permit the making of suitable conduit connections to the valve, an inlet connection being shown at 14 and an outlet connection at 15.

Between the portions 12 and 13, the body is constructed with a transverse bore passage 16 which connects with a counterbore portion 16a formed in the central projecting portion 11. Between the ends of the bore passage 16, the passage is counterbored to provide an inlet chamber 17 and an outlet chamber 18, the inlet chamber being in communication with the inlet connection 14 through a bore passage 19, and the outlet chamber being in communication with the outlet connection 15 through a bore passage 20.

An elongate cylindrical poppet 21 is supported in the bore passage 16 for reciprocable movement therein, the poppet having a head portion 22 positioned in the counterbore 16a between stop limits established by the bottom flange 23 and a snap ring 24.

The adjacent ends of the inlet and outlet chambers are sealed by a sealing O-ring 25 in a receiving groove 26 of the adjacent body wall, this groove having a backup flange 27 along the side facing the inlet chamber 17. The outer end of the inlet chamber 17 is sealed with respect to the poppet 21 by an O-ring 28 positioned within the receiving groove 29 having a backup flange 30 along its outermost side. Similarly, the outermost end of the outlet chamber 18 is sealed with respect to the poppet 21 by an O-ring 31 in a receiving groove 32 having a backup flange 33 along its outer side.

To provide for modulation of the fluid flow between the inlet chamber 17 and the outlet chamber 18, provision is made for by-passing fluid flow around the sealing O-ring 25 which separates the inlet chamber and outlet chamber. The arrangement for accomplishing this purpose, as will subsequently be described, permits the by-passed flow of fluid to be increased or decreased in small increments in response to reciprocable movement of the poppet 21 in opposite directions.

More specifically, the outer surface of the poppet 21 is provided with a plurality of longitudinally extending slits 34 which are milled or otherwise formed in the poppet surface at circumferentially spaced intervals around the surface exterior of the poppet. These slits must be extremely small e.g. of the order of .004 inch in width to prevent extrusion of the O-ring therethrough under the high operating pressure, and are arranged so that the slits will continuously communicate with the outlet chamber 18, but may be successively placed in communication or noncommunication with the inlet chamber in response to reciprocable movement of the poppet 21. To accomplish this, the slits have one set of their similarly positioned ends, namely the ends extending towards the poppet head portion 22, arranged in spiralled or staggered relation circumferentially of the poppet. With this arrangement, the ends may be successively moved past the sealing O-ring 25 to connect or disconnect the slits for by-passing fluid from the inlet chamber to the outlet chamber or discontinuing such passage through the slit.

While the foregoing arrangement permits modulation of fluid flow in small controlled increments, it may be desirable to also be able to obtain full flow between the inlet and outlet chambers at a particular position of the poppet. For this purpose, the poppet is further provided with an inclined transversely extending passage 35 which may be positioned by movement of the poppet 21 so that its inlet and outlet openings, which are in the poppet surface and axially spaced thereof, are on opposite sides of the O-ring 25 and interconnect the inlet chamber 17 with the outlet chamber 18 so as to pass full or greater flow therebetween than would be possible by the slits 34.

Referring to FIG. 3, a slightly modified slit configuration is disclosed. Instead of constructing the slits 34 with parallel sides and square ends, the slits are tapered toward their respective ends, and the ends pointed as indicated by the numeral 40. The modified arrangement thus enables a finer modulation of the fluid.

It will be appreciated that a variety of arrangements might be utilized to actuate the poppet with reciprocable axial movements. One arrangement would be to provide a hand knob 36 which is connected with the poppet 21 through a suitable swivel connection, and which is in threaded engagement, as indicated by the numeral 37 with the central projecting portion 11. With this arrangement, rotational movement of the knob will through the action of the threaded connection 37 move the poppet 21 in desired direction to modulate the fluid flow.

It will be evident from the above description that the valve of the present invention accomplishes the related objects.

Various modifications may suggest themselves to those skilled in the art without departing from the spirit of my invention, and, hence, I do not wish to be restricted to the specific form shown or uses mentioned, except to the extent indicated in the appended claims.

I claim:

1. A balanced high pressure fluid modulating valve, comprising: means including a wall defining a valve chamber; an elongate axially movable poppet extending through said chamber having a cylindrical outer surface; poppet sealing means respectively at opposite ends of said chamber; a circumferential seal member between said poppet outer surface and adjacent chamber wall separating said chamber into fluid inlet and fluid outlet sections disposed on opposite sides of said seal in which the fluid pressures act radially inwardly on said outer surface; a plurality of elongate low flow narrow slits extending generally longitudinally of said poppet in said outer surface thereof and being spaced apart circumferentially of said poppet, all of said slits being continuously in communication with said outlet section, and successively connectable and disconnectable with said inlet section in response to axial movements of said poppet in opposite directions to modulate flow from the inlet section to the outlet section; means for varying the position of said poppet to change the operative number of slits; and an enlarged auxiliary flow passage in said poppet for connecting said sections for non-modulated increased flow at a predetermined position in the movement of said poppet, said auxiliary passage having opposite end openings in the poppet outer surface in spaced relation axially of the poppet, said passage openings being at a location axially of the poppet in relation to said slits wherein both openings will communicate with said outlet section during modulating movements of said poppet, and at said predetermined position of the poppet will have one opening positioned in the inlet section and the other in the outlet section so that the auxiliary passage provides a by-pass with respect to said circumferential seal member.

2. A balanced high pressure fluid modulating valve, comprising: means including a wall defining a valve chamber; an elongate axially movable poppet in extending through said chamber having a cylindrical outer surface; poppet sealing means respectively at opposite ends of said chamber; a circumferential seal member between said poppet outer surface and adjacent chamber wall separating said chamber into fluid inlet and fluid outlet sections disposed on opposite sides of said seal in which the fluid pressures act radially inwardly on said outer surface; a plurality of elongate low flow narrow slits extending generally longitudinally of said poppet in said outer surface thereof and being spaced apart circumferentially of said poppet, all of said slits being continuously in communication with said outlet section, and successively connectable and disconnectable with said inlet section in response to axial movements of said poppet in opposite directions to selectively modulate flow from the inlet section to the outlet section; means for varying the position of said poppet in accordance with the flow desired; and an enlarged transverse flow passage in said poppet having a longitudinal axis extending at an angle to the axis of said poppet for connecting said sections for non-modulated increased flow above the capacity of said slits at a predetermined position in the movement of said poppet, said transverse flow passage having opposite end openings in the poppet outer surface in spaced relation axially of the poppet, said passage being at a location axially of the poppet in relation to said slits such that both openings will communicate with said outlet section during modulating movements of said poppet, and at said predetermined position of the poppet will have one of its openings positioned in the inlet section and the other of its openings positioned in the outlet section to provide a by-pass with respect to said circumferential seal member.

References Cited in the file of this patent

UNITED STATES PATENTS

| | | |
|---|---|---|
| 371,063 | Hays | Oct. 4, 1887 |
| 2,764,181 | Richolt | Sept. 25, 1956 |
| 2,764,995 | Krupp | Oct. 2, 1956 |
| 2,980,392 | Greenwood | Apr. 18, 1961 |